US012625592B2

(12) United States Patent
Kim

(10) Patent No.: US 12,625,592 B2
(45) Date of Patent: \*May 12, 2026

(54) 3D DOCUMENT EDITING SYSTEM

(71) Applicant: Apple Inc., Cupertino, CA (US)

(72) Inventor: Seung Wook Kim, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 111 days.

This patent is subject to a terminal disclaimer.

(21) Appl. No.: 17/079,355

(22) Filed: Oct. 23, 2020

(65) Prior Publication Data

US 2021/0042010 A1     Feb. 11, 2021

Related U.S. Application Data

(63) Continuation of application No. 15/271,196, filed on Sep. 20, 2016, now Pat. No. 10,817,126.

(51) Int. Cl.
  G06F 3/04845 (2022.01)
  G02B 27/01 (2006.01)
  (Continued)

(52) U.S. Cl.
  CPC ....... G06F 3/04815 (2013.01); G02B 27/017 (2013.01); G06F 3/011 (2013.01);
  (Continued)

(58) Field of Classification Search
  CPC ........ G06F 3/017; G06F 3/02; G06F 3/04815; G06F 3/011; G06F 3/0487;
  (Continued)

(56) References Cited

U.S. PATENT DOCUMENTS

| | | | |
|---|---|---|---|
| 5,670,984 A | 9/1997 | Robertson et al. | |
| 5,689,287 A | 11/1997 | Mackinlay et al. | |

(Continued)

FOREIGN PATENT DOCUMENTS

| | | |
|---|---|---|
| CN | 104471563 A | 3/2015 |
| CN | 105653084 A | 6/2016 |

(Continued)

OTHER PUBLICATIONS

Office Action mailed Aug. 4, 2021 in Chinese Patent Application No. 201780052260.5, Apple Inc., pp. 1-13 (including translation).

(Continued)

*Primary Examiner* — Alvin H Tan

(74) *Attorney, Agent, or Firm* — Robert C. Kowert; Kowert, Hood, Munyon, Rankin & Goetzel, P.C.

(57) ABSTRACT

A 3D document editing system and graphical user interface (GUI) that includes a virtual reality and/or augmented reality device and an input device (e.g., keyboard) that implements sensing technology for detecting gestures by a user. Using the system, portions of a document can be placed at or moved to various Z-depths in a 3D virtual space provided by the VR device to provide 3D effects in the document. The sensing technology may allow the user to make gestures while entering text via a keypad, thus allowing the user to specify 3D effects in the document while typing. The system may also monitor entries made using the keypad, apply rules to the entries to detect particular types of entries such as URLs, and automatically shift the detected types of entries forward or backward on the Z axis relative to the rest of the content in the document.

17 Claims, 12 Drawing Sheets

(51) Int. Cl.

| | |
|---|---|
| *G06F 3/01* | (2006.01) |
| *G06F 3/04815* | (2022.01) |
| *G06F 3/0487* | (2013.01) |
| *G06F 3/04883* | (2022.01) |

(52) U.S. Cl.
CPC ............ *G06F 3/017* (2013.01); *G06F 3/0487* (2013.01); *G06F 3/04883* (2013.01); *G02B 2027/0141* (2013.01); *G02B 2027/0187* (2013.01)

(58) Field of Classification Search
CPC ............. G06F 3/04883; G06F 3/04845; G02B 27/017; G02B 2027/0141; G02B 2027/0187
See application file for complete search history.

(56) References Cited

U.S. PATENT DOCUMENTS

| | | | | |
|---|---|---|---|---|
| 5,923,848 | A * | 7/1999 | Goodhand | ........... G06Q 10/107 709/219 |
| 6,323,846 | B1 | 11/2001 | Westerman et al. | |
| 7,835,504 | B1 * | 11/2010 | Donald | ................... H04L 51/58 379/88.13 |
| 9,244,533 | B2 | 1/2016 | Friend et al. | |
| 9,437,038 | B1 | 9/2016 | Costello et al. | |
| 9,471,150 | B1 | 10/2016 | Addaguduru | |
| 9,547,438 | B2 | 1/2017 | Bromer | |

| | | | | |
|---|---|---|---|---|
| 10,817,126 | B2 | 10/2020 | Kim | |
| 2010/0005426 | A1 * | 1/2010 | Van | ........................ G06Q 30/02 707/E17.108 |
| 2012/0326961 | A1 | 12/2012 | Bromer | |
| 2014/0125584 | A1 | 5/2014 | Kun et al. | |
| 2015/0082145 | A1 | 3/2015 | Ames et al. | |
| 2015/0169120 | A1 | 6/2015 | Sanchez et al. | |
| 2017/0097733 | A1 | 4/2017 | Edgar et al. | |
| 2018/0081519 | A1 | 3/2018 | Kim | |

FOREIGN PATENT DOCUMENTS

| | | |
|---|---|---|
| CN | 105814532 A | 7/2016 |
| KR | 20110032224 A | 3/2011 |
| WO | 2014178039 | 11/2014 |

OTHER PUBLICATIONS

Messaci, et al., "3D Interaction techniques using gestures recognition in virtual environment," 2015 4th International Conference on Electrical Engineering (ICEE), Dec. 30, 2015, 5 pages, downloaded from IEEE Xplore.

Hongli, Deng, "Human-Computer interaction system based on virtual reality and gesture recognition," China New Communications, Mar. 5, 2015, 1 page, China Academic Journal Electronic Publishing House, http://www.cnki.net.

International Search Report and Written Opinion from PCT/US2017/048285, dated Oct. 19, 2017, Apple Inc., pp. 1-13.

* cited by examiner display a document to a user in 3D virtual space
1000 receive text input to the document via a keypad of a keyboard and display the received text in the document
1010 detect gesture input to a sensing area of the keyboard
1020 move an area of text or a portion of the text in the document forward or backward on the Z axis of the virtual space according to the detected gesture input
1030

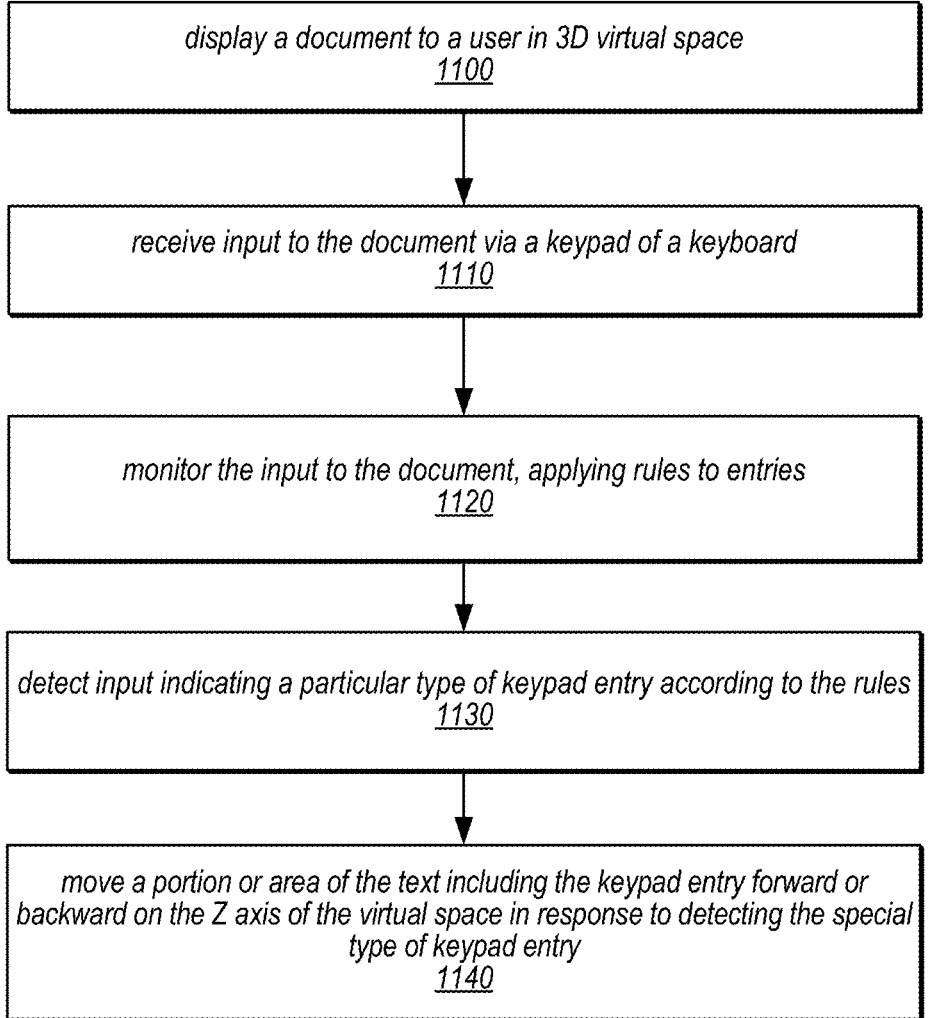

display a document to a user in 3D virtual space
1100 receive input to the document via a keypad of a keyboard
1110 monitor the input to the document, applying rules to entries
1120 detect input indicating a particular type of keypad entry according to the rules
1130 move a portion or area of the text including the keypad entry forward or backward on the Z axis of the virtual space in response to detecting the special type of keypad entry
1140

*FIG. 5*

3D DOCUMENT EDITING SYSTEM

BACKGROUND

This application is a continuation of U.S. patent application Ser. No. 15/271,196, filed on Sep. 20, 2016, which is hereby incorporated by referenced herein its entirety.

Conventional graphical user interfaces (GUIs) for text generation and editing systems work in a two-dimensional (2D) space (e.g., a 2D screen or page on a screen). Highlighting areas or portions of text using these GUIs typically involves adding some effect in 2D such as bold or italics text, underlining, or coloring. Virtual reality (VR) allows users to experience and/or interact with an immersive artificial three-dimensional (3D) environment. For example, VR systems may display stereoscopic scenes to users in order to create an illusion of depth, and a computer may adjust the scene content in real-time to provide the illusion of the user interacting within the scene. Similarly, augmented reality (AR) and mixed reality (MR) combine computer generated information with views of the real world to augment, or add content to, a user's view of their environment. The simulated environments of VR and/or the enhanced content of AR/MR may thus be utilized to provide an interactive user experience for multiple applications, such as interacting with virtual training environments, gaming, remotely controlling drones or other mechanical systems, viewing digital media content, interacting with the internet, or the like.

Conventional VR, AR, and MR systems may allow content consumers to view and interact with content in a 3D environment. Conventional VR systems may provide tools and applications that allow VR content creators to create and edit 3D objects, and may provide a text generation and editing system with a conventional 2D GUI that allows content creators to generate text content that can be attached to 3D objects. However, these conventional VR systems typically do not provide text generation and editing systems with GUIs that allow content creators to generate and edit text with 3D effects in a VR 3D environment.

SUMMARY

Various embodiments of methods and apparatus for generating and editing documents with three-dimensional (3D) effects for text content in a 3D virtual view space. Embodiments of 3D document editing systems, methods, and graphical user interfaces (GUIs) are described that may include a virtual reality (VR) device such as a VR headset, helmet, goggles or glasses for displaying documents in a 3D virtual space, and an input device (e.g., keyboard) for entering and editing text or other content in the documents and that includes sensing technology for detecting gestures by the user. The VR device and input device may be coupled via a wired or wireless (e.g., Bluetooth) connection. The VR device may be configured to display a 3D text generation and editing GUI in a virtual space that includes a virtual screen for entering or editing text in documents via a keypad of the input device. Unlike conventional 2D graphical user interfaces, using embodiments of the 3D document editing system, a text area or text field of a document can be placed at or moved to various Z-depths in the 3D virtual space. The input device (e.g., keyboard) may include sensing technology, for example a motion, touch, and/or pressure sensing region or area on a keyboard, for detecting a user's gestures, for example motions of the user's thumbs when on or near the sensing region. The VR device may detect gestures made by the user via the sensing technology, and in response may move selected content in a document (e.g., words, paragraphs, sections, columns, sentences, text boxes, uniform resource locators (URLs) or other active text, etc.) forward or backward on a Z axis in the 3D virtual space relative to the rest of the document according to the detected gestures. The sensing technology of the keyboard may be configured to allow the user to make the gestures while entering text via the keypad, thus allowing the user to provide the 3D effects to text while typing.

In some embodiments, the gestures may include a gesture (e.g., moving both thumbs down on a sensing region of a keyboard) to move an area of the document (e.g., a paragraph, section, column, text field, text box, etc.) forward on the Z axis in 3D space relative to the document. In some embodiments, the gestures may include a gesture (e.g., moving both thumbs up on the sensing region) to move an area of the document backward on the Z axis in 3D space relative to the document. In some embodiments, the gestures may include a gesture (e.g., moving one thumb down on the sensing region) to move a portion of text in the document (e.g., a uniform resource locator (URL), sentence, word, title or heading, etc.) forward on the Z axis in 3D space relative to other content of the document. In some embodiments, the gestures may include a gesture (e.g., moving one thumb up on the sensing region) to move a portion of text in the document backward relative to other content of the document.

In some embodiments, the VR device may instead or also monitor text entry made using a keypad of the keyboard, apply rules to the text entry to determine particular kinds of text items such as URLs, and automatically shift the particular kinds of text items (e.g., URLs) forward or backward on the Z axis relative to the rest of the content in the document.

In some embodiments, a document generated using the 3D text editing system may be displayed to content consumers in a 3D virtual space via VR devices, with portions of the document (e.g., paragraphs, text boxes, URLs, sentences, words, sections, columns, etc.) shifted backward or forward on the Z axis relative to the rest of the content in the document to highlight or differentiate those parts of the document. For example, active text fields or hot links such as URLs may be moved forward relative to other content in the document so that they are more visible and easier to access by the consumer in the 3D virtual space using a device such as a controller or hand gestures.

In some embodiments, the VR device may also provide augmented reality (AR) or mixed reality (MR) by combining computer generated information with a view of the user's environment to augment, or add content to, a user's view of the world. In these embodiments, the 3D text generation and editing GUI may be displayed in an AR or MR view of the user's environment.

BRIEF DESCRIPTION OF THE DRAWINGS

FIG. 5 is a flowchart of an example method for automatically moving text content forward or backward on Z axis relative to a document in response to user text input, according to some embodiments.

Figure 1A:
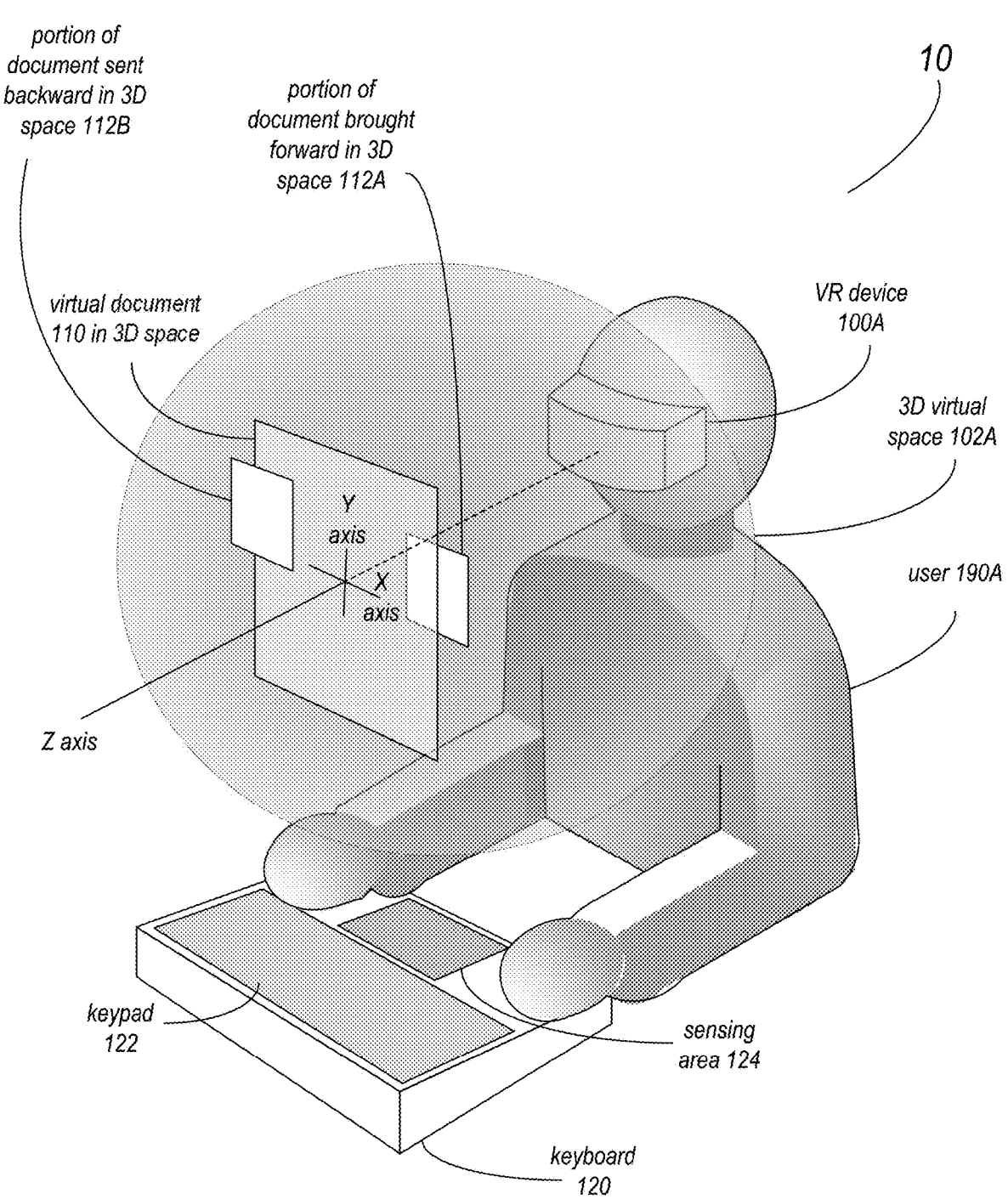
FIG. 1A illustrates a 3D document editing system, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for generating and editing documents with three-dimensional (3D) effects for text content in a 3D virtual view space. Embodiments of 3D document editing systems, methods, and graphical user interfaces (GUIs) are described that may include a virtual reality (VR) device such as a VR headset, helmet, goggles, or glasses for displaying documents in a 3D virtual space, and an input device (e.g., keyboard) for entering and editing text or other content in the documents and that includes sensing technology for detecting gestures by the user. Unlike conventional 2D graphical user interfaces, using embodiments of the 3D document editing system, a text area or text field of a document can be placed at or moved to various Z-depths in the 3D virtual space to provide 3D effects for areas or portions of the text in the document. The sensing technology may allow the user to make the gestures while entering text via the keypad, thus allowing the user to specify the 3D effects for text areas or fields (paragraphs, text boxes, sections, columns, etc.), or text portions (sentences, words, URLs, etc.) while typing. In some embodiments, the VR device may instead or also monitor text entry made using a keypad of the keyboard, apply rules to the text entry to determine particular kinds of text items such as URLs, and automatically shift the particular kinds of text items (e.g., URLs) forward or backward on the Z axis relative to the rest of the content in the document.

In some embodiments, a document generated using the 3D text editing system may be displayed to content consumers in a 3D virtual space via VR devices, with portions of the document (e.g., paragraphs, sections, columns, text boxes, URLs, etc.) shifted backward or forward on the Z axis relative to the rest of the content in the document to highlight or differentiate those parts of the document. For example, active text fields or hot links such as URLs may be moved forward relative to other content in the document so that they are more visible and easier to access by the consumer in the 3D virtual space using a device such as a controller or hand gestures.

In some embodiments, the gestures may include a gesture (e.g., moving both thumbs down on a sensing region of a keyboard) to move an area of the document (e.g., a paragraph, section, column, text field, text box, etc.) forward on the Z axis in 3D space relative to the document. In some embodiments, the gestures may include a gesture (e.g., moving both thumbs up on the sensing region) to move an area of the document backward on the Z axis in 3D space relative to the document. In some embodiments, the gestures may include a gesture (e.g., moving one thumb down on the sensing region) to move a portion of text in the document (e.g., a URL, sentence, word, title or heading, etc.) forward on the Z axis in 3D space relative to other content of the document. In some embodiments, the gestures may include a gesture (e.g., moving one thumb up on the sensing region) to move a portion of text in the document backward relative to other content of the document. While these gestures are given by way of example, other gestures to generate these 3D effects may be supported in some embodiments, and/or other gestures may be supported to provide other 3D effects for text in a document, such as gestures to tilt or rotate an area or portion of text relative to other content in the document.

As used herein, "text" refers to any alphanumeric and/or symbolic content that may be entered or edited in a document, for example using a keypad (e.g., a conventional "QWERTY" keypad) of a keyboard device. As used herein, "document" refers to any of various types of text documents, documents that include but are not restricted to text, or more generally any graphical user interface construct (e.g., window, box, or screen) that may include text content and in which text may be entered, edited, and viewed in a 3D virtual space. Examples of "documents" that may be created or edited in a 3D document editing system as described herein may include, but are not limited to: books, papers, forms, email messages, text messaging windows, web pages or other web content, message board posts, and so on. As used herein, "text area" refers to any grouping of text in a document such as a paragraph, a column on a page, a section of a document, or a text field or text box (e.g., a graphical rectangle or window in a document that contains text). As used herein, "text portion" refers to any string of text in a document such as a word, a sentence or a portion of a sentence, a phrase, a title or heading, a name, or an active text field or hot link such as a uniform resource locator (URL).

Embodiments of the 3D document editing system may be implemented as a stand-alone text generating, editing, and viewing application, or may be integrated into other applications to provide 3D text generation, editing, and viewing capabilities for the applications. In some embodiments, the VR device may also provide augmented reality (AR) or mixed reality (MR) by combining computer generated information with a view of the user's environment to augment, or add content to, a user's view of the world. In these embodiments, the 3D text generation and editing GUI may be displayed in an AR or MR view of the world.

Figure 6:
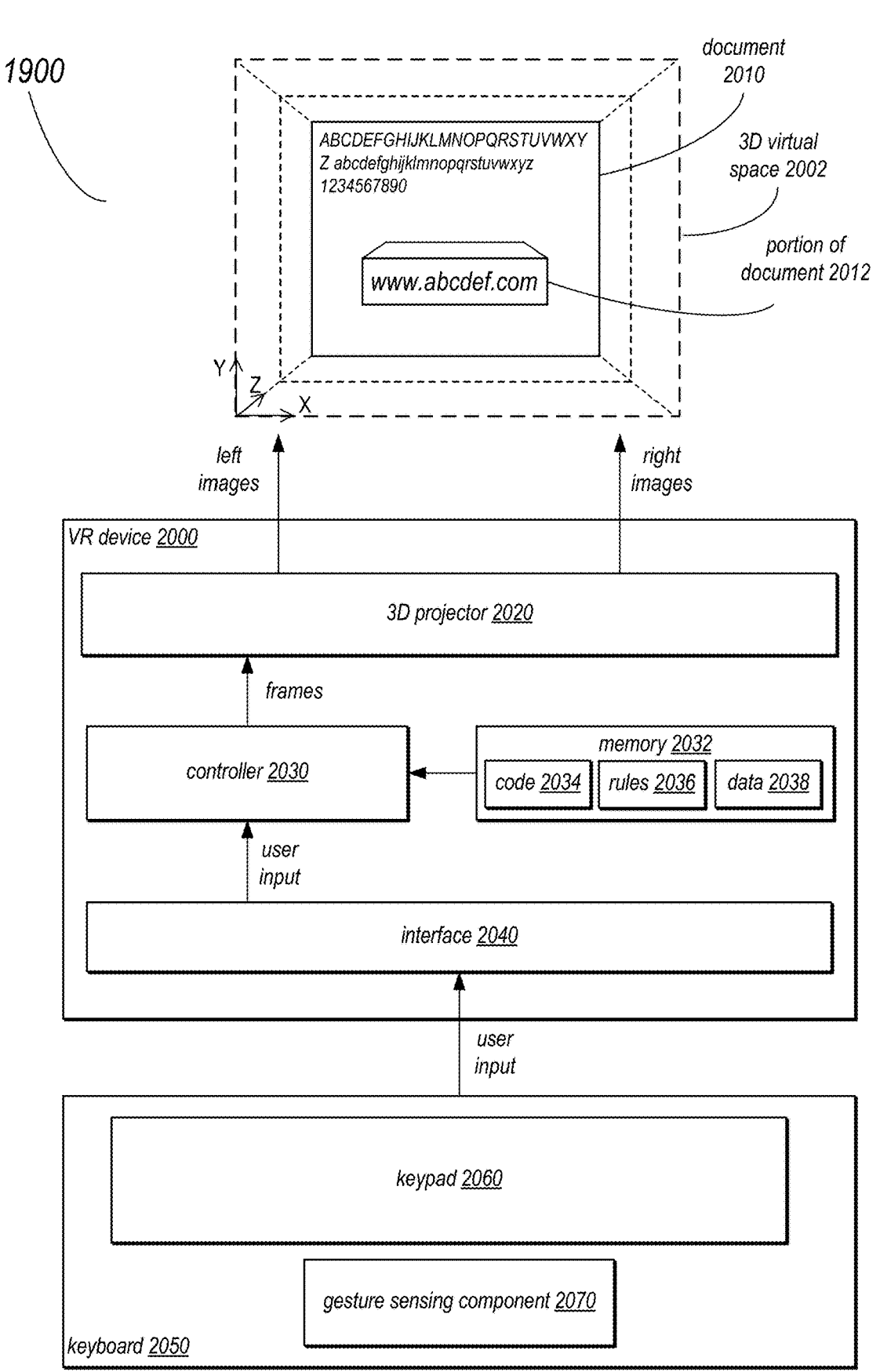
FIG. 6 is a block diagram illustrating components of a 3D document editing system, according to some embodiments.

FIG. 1A illustrates a 3D document editing system 10, according to some embodiments. In some embodiments, a 3D document editing system 10 may include a virtual reality (VR) device 100A such as a VR headset, helmet, goggles, or glasses, and an input device (e.g., keyboard 120). The VR device 100A and keyboard 120 may be coupled via a wired or wireless (e.g., Bluetooth) connection. While not shown in FIG. 1A, in some embodiments the document editing system 10 may include one or more other components. For example, the system may include a cursor control device (e.g., mouse) for moving a virtual cursor in the 3D virtual space 102A, selecting portions or areas of text or other content, and so on. As another example, in some embodiments, the 3D document editing system 10 may include a computing device coupled to the VR device 100A and keyboard 120 via wired or wireless (e.g., Bluetooth) connections that implements at least some of the functionality of the document editing system 10, for example processing user inputs to the keyboard 120 and generating images and image content to be displayed in the 3D virtual space 102A by the VR device 100A. FIG. 6 further illustrates components of an example 3D document editing system, according to some embodiments.

Referring to FIG. 1A, VR device 100A may implement any of various types of VR projector systems. For example, the VR device 100A may include a near-eye VR projector that projects left and right images on screens that are viewed by a subject, such as DLP (digital light processing), LCD (liquid crystal display) and LCoS (liquid crystal on silicon) technology VR projectors. As another example, the VR device 100A may include a direct retinal VR projector that scans left and right images, pixel by pixel, directly to the subject's eyes. To create a three-dimensional (3D) effect, objects at different depths or distances in the two images are shifted left or right as a function of the triangulation of distance, with nearer objects shifted more than more distant objects.

Keyboard 120 may, for example, be a physical keyboard device that includes a keypad 122, for example a QWERTY keypad, for entering alphanumeric text, punctuation marks, symbols, etc. The keyboard 120 may also implement sensing technology, for example at an area 124 just below a spacebar of the keypad 122, that is configured to sense gestures made by a user, for example motions made with the user 190A's thumbs. The sensing area 124 may, for example, implement one or more of motion sensing, pressure/force sensing, or capacitive (touch) sensing technology. In some embodiments, keyboard 120 may instead be implemented as a digital keyboard, for example displayed on a touch-enabled screen of a device such as a pad or tablet. In some embodiments, keyboard 120 may instead be implemented as a virtual keyboard displayed in 3D virtual space 102A.

The VR device 100A may be configured to display a virtual document 110 in a 3D virtual space 102A according to a 3D text generation and editing GUI provided by the VR device 100A that allows the user 190A to enter or edit text in the document 110 via a keypad 122 (e.g., a standard QWERTY keypad) of the keyboard 120. Unlike conventional 2D graphical user interfaces, using embodiments of the 3D document editing system 10, a text area or text field of a document 110 can be placed at or moved to various Z-depths in the 3D virtual space 102A. The keyboard 120 may include sensing technology, for example a motion, touch, and/or pressure sensing pad, area, or region 124 on the keyboard 120, for detecting user 190A's gestures, for example motions of the user 190A's thumbs when on or near the sensing area 124. The VR device 100A may detect gestures made by the user 190A via the sensing area 124, and in response may move selected content in document 110 (e.g., paragraphs, sections, columns, sentences, text boxes, URLs, etc.) forward (112A) or backward (112B) on a Z axis in the 3D virtual space 102A relative to the rest of the document 110 according to the detected gestures. The sensing area 124 of the keyboard 120 may be configured to allow the user 190A to make the gestures while entering text via the keypad 122, thus allowing the user 190A to provide the 3D effects 112A or 112B to areas or portions of text in the document 110 while typing.

In some embodiments, the gestures may include a gesture (e.g., moving both thumbs down on the sensing area 124) to move an area of text in the document 110 (e.g., a paragraph, section, column, text field, text box, etc.) forward on the Z axis in 3D virtual space 102A relative to the document 110. In some embodiments, the gestures may include a gesture (e.g., moving both thumbs up on the sensing area 124) to move an area of the document 110 backward on the Z axis in 3D virtual space 102A relative to the document 110. In some embodiments, the gestures may include a gesture (e.g., moving one thumb down on the sensing area 124) to move a portion of text in the document 110 (e.g., e.g., a URL, sentence, word, title or heading, etc.) forward on the Z axis in 3D virtual space 102A relative to other content of the document 110. In some embodiments, the gestures may include a gesture (e.g., moving one thumb up on the sensing area 124) to move a portion of text in the document 110 backward on the Z axis in 3D virtual space 102A relative to other content of the document 110. FIGS. 2A through 2C and 3A through 3C further illustrate various example gestures, according to some embodiments. FIGS. 4A and 4B describe example methods for processing gestures to add 3D effects to a document 110 that may be used in a 3D document editing system 10 as illustrated in FIG. 1A, according to some embodiments.

Referring again to FIG. 1A, in some embodiments, the VR device 100A may instead or also monitor text entry made using the keypad 122 of the keyboard 124, apply rules to the entered text to determine particular kinds of text items such as URLs, and automatically shift the particular kinds of text items (e.g., URLs) forward or backward on the Z axis relative to the rest of the content in the document 110. FIG. 5 describes an example method for processing text entry to add 3D effects to a document 110 that may be used in a 3D document editing system 10 as illustrated in FIG. 1A, according to some embodiments.

In some embodiments, the VR device 100A may also provide augmented reality (AR) or mixed reality (MR) by combining computer generated information with a view of the user 190A's environment to augment, or add content to, the user's view of the world. For example, the VR device 100A may allow at least some light from the user 190A's environment to pass through to the user 190A's eyes; the VR device 100A simultaneously projects virtual content to the user's eyes, thus providing an AR or MR view of the user 190A's environment. Alternatively, the VR device 100A may include video cameras that capture views of the environment; virtual content generated by the device 100 is then composited with the video frames to provide an AR or MR view of the world. In these embodiments, the 3D virtual space 102A is an AR or MR space, and the virtual document 110 may be displayed in an AR or MR view of the user 190's environment.

Figure 1B:
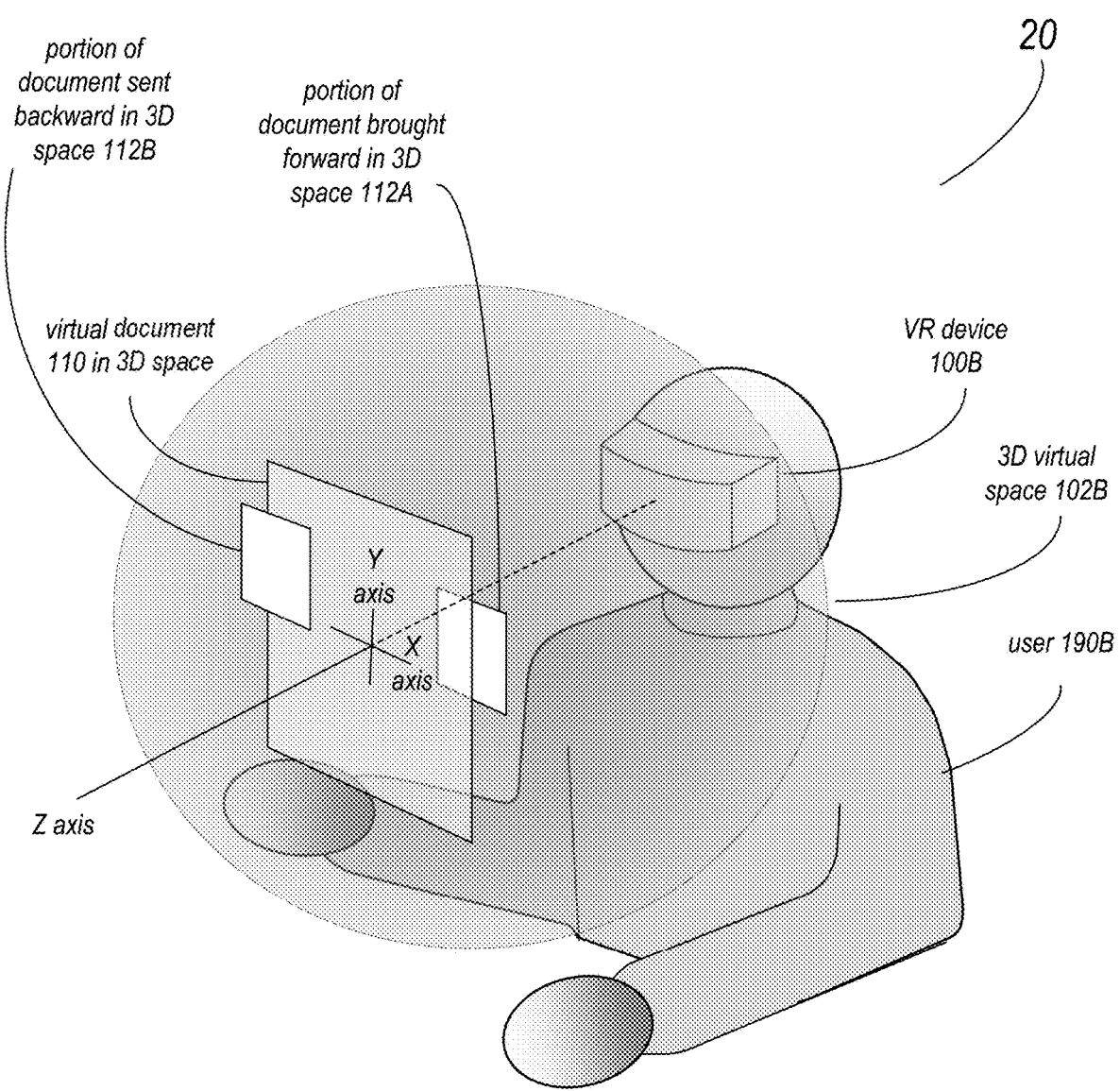
FIG. 1B illustrates a 3D document viewing system, according to some embodiments.

FIG. 1B illustrates a 3D document viewing system 20, according to some embodiments. In some embodiments, a document 110 generated using a 3D document editing system 10 as illustrated in FIG. 1A may be displayed to a user 190B in a 3D virtual space 102B via a VR device 100B, with portions 112A and 112B of the document 110 (e.g., paragraphs, sections, columns, text boxes, URLs, etc.) shifted forward or backward on the Z axis relative to the rest of the content in the document 110 to highlight or differentiate those parts of the document 110. For example, active content such as URLs may be moved forward relative to other content in the document 110 so that it is more visible and easier to access in the 3D virtual space 102B.

In some embodiments, a 3D document viewing system 20 may include a virtual reality (VR) device 100B such as a VR headset, helmet, goggles, or glasses). While not shown in FIG. 1B, in some embodiments the document viewing system 20 may include one or more other components. For example, the system may include a cursor control device (e.g., mouse) for moving a virtual cursor in the 3D virtual space 102B to control the display of the virtual document 110 (e.g., scrolling, zooming, etc.). As another example, in some embodiments, the 3D document viewing system 20 may include a computing device coupled to the VR device 100B via a wired or wireless (e.g., Bluetooth) connection that implements at least some of the functionality of the document viewing system 20, for example generating images and image content to be displayed in the 3D virtual space 102B by the VR device 100B.

VR device 100B may be implemented as any of various types of VR systems. For example, the VR device 100B may be a near-eye VR system that projects left and right images on screens that are viewed by a subject, such as DLP (digital light processing), LCD (liquid crystal display) and LCoS (liquid crystal on silicon) technology VR systems. As another example, the VR device 100B may be a direct retinal projector system that scans left and right images, pixel by pixel, directly to the subject's eyes. To create a three-dimensional (3D) effect, objects at different depths or distances in the two images are shifted left or right as a function of the triangulation of distance, with nearer objects shifted more than more distant objects. In some embodiments, the VR device 100B may be configured to display a virtual document 110 in a 3D virtual space 102B according to a 3D text viewing GUI provided by the VR device 100B that allows the user 190B to view the document 110. Unlike conventional 2D graphical user interfaces, different text areas or text portions 112 of the document 110 may appear at various Z-depths in the 3D virtual space 102B.

FIGS. 2A through 2C and 3A through 3C describe several example gestures that may be used in embodiments of a 3D document editing system to add example 3D effects to text in documents. Note that these examples are not intended to be limiting. In some embodiments, other gestures than those described may be used to add similar 3D effects as those described to text in a document. Further, some embodiments may support gestures to add other 3D effects than those described to a document.

Figure 2A:
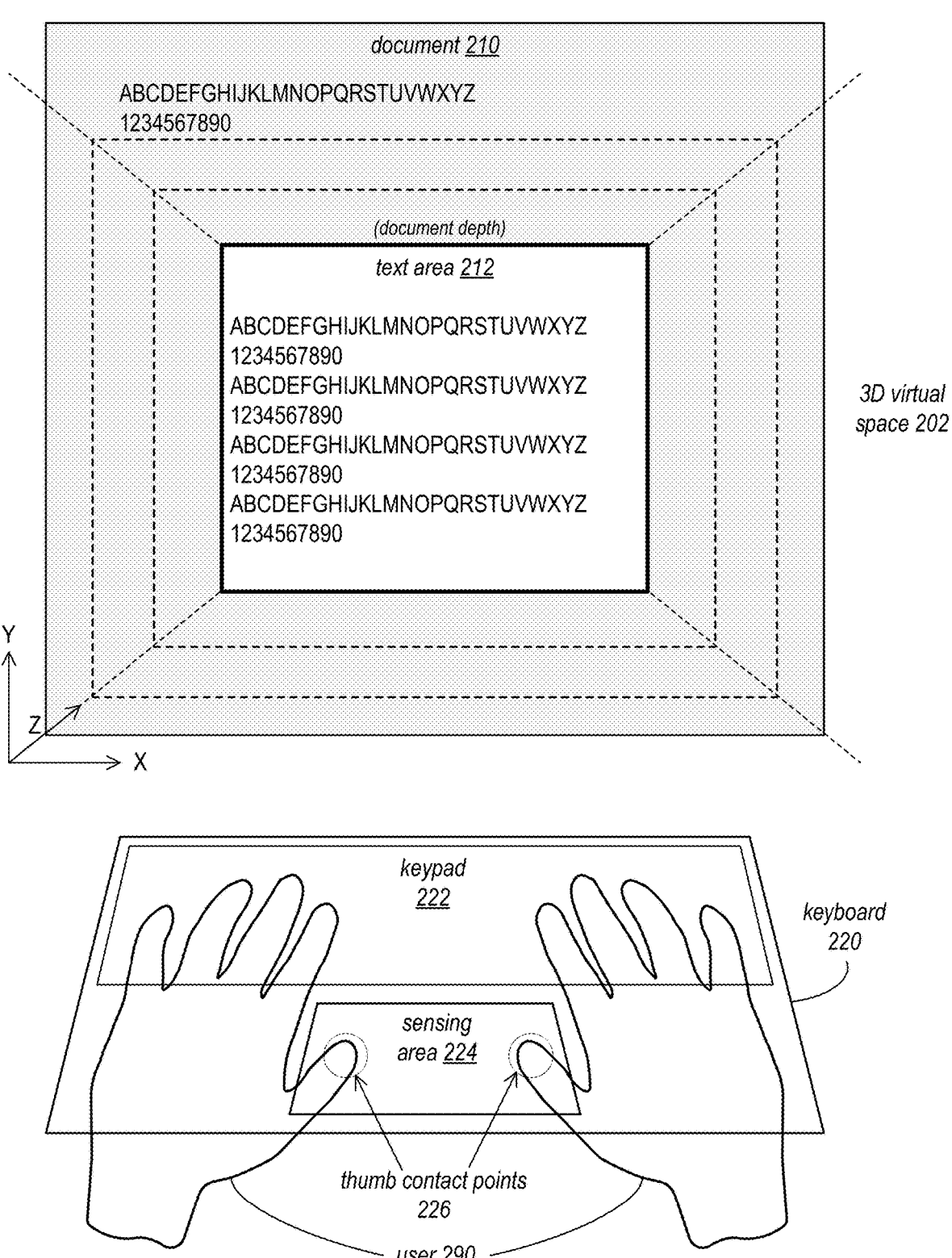
FIGS. 2A through 2C illustrate moving an area of text forward or backward on a Z axis relative to a document in a 3D virtual space in response to user gestures, according to some embodiments.
Figure 2B:
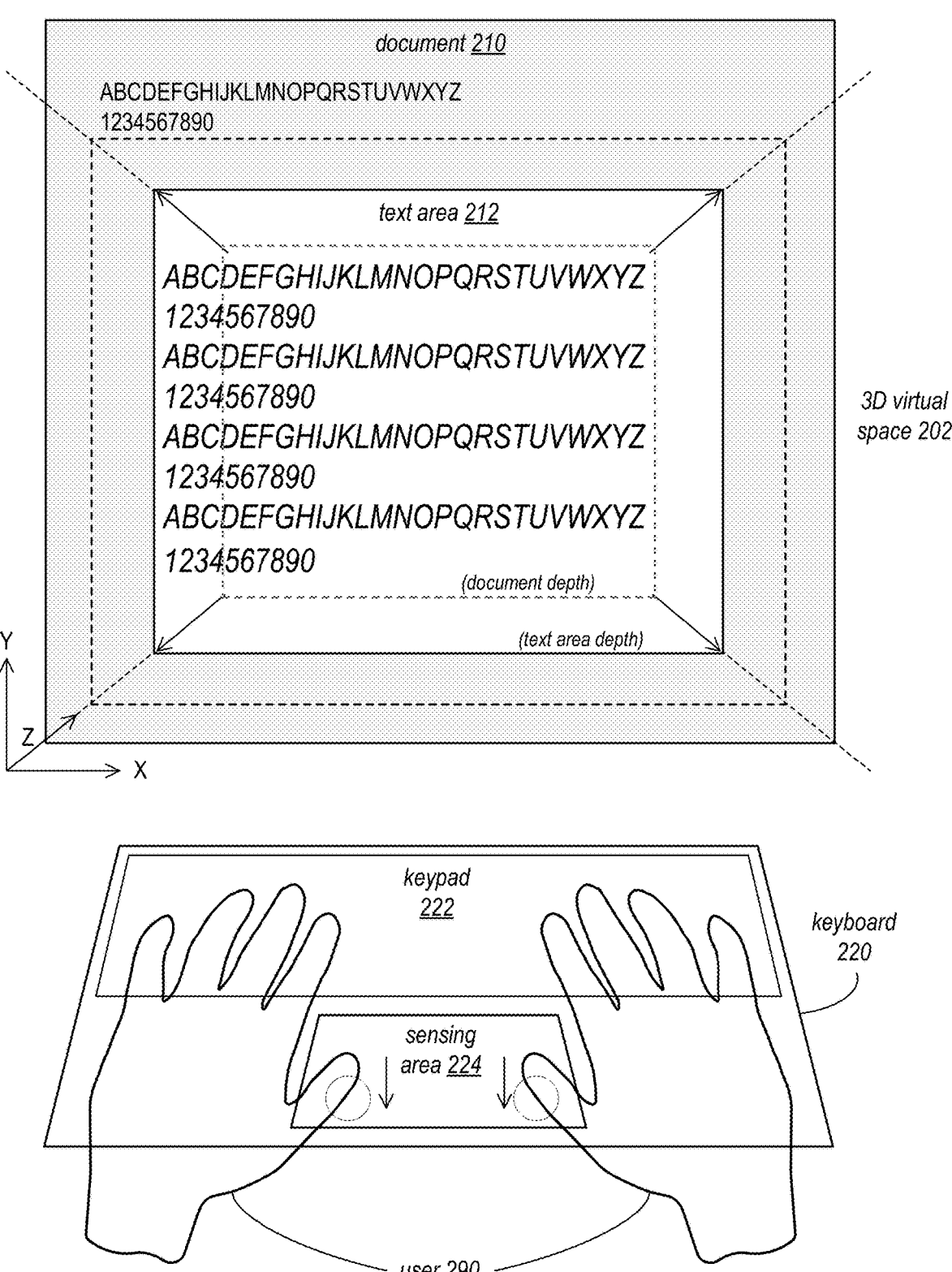
Figure 2C:
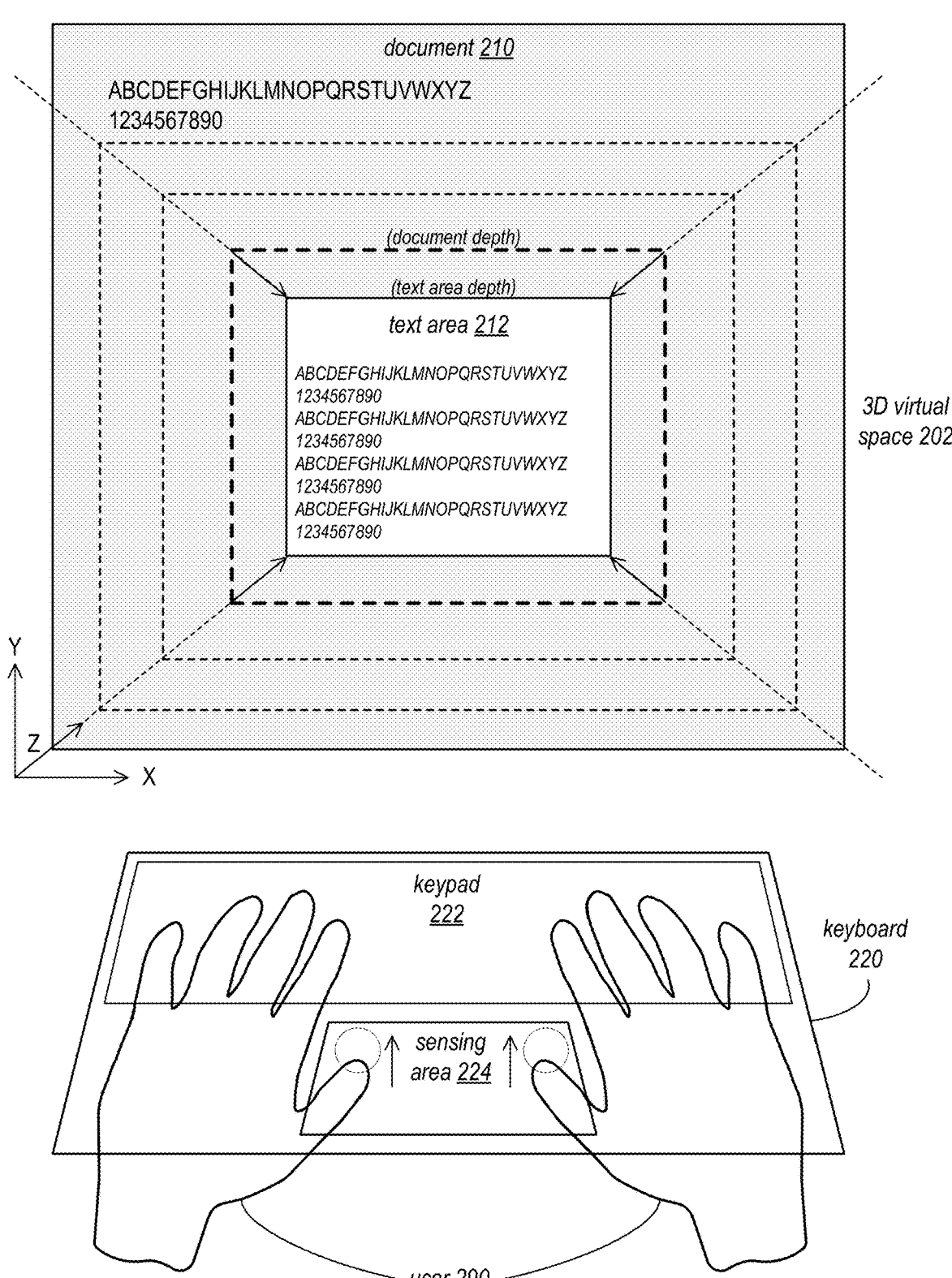

FIGS. 2A through 2C graphically illustrate moving an area of text forward or backward on a Z axis relative to a document in a 3D virtual space in response to user gestures, according to some embodiments. As shown in FIG. 2A, a document creator and/or editor (user 290) may use a VR device (not shown) and keyboard 220 of a 3D document editing system to view and edit a document 210 in a 3D virtual space 202 projected by the VR device. The document may include a text area 212 (e.g., a paragraph, section, column, text field, text box, etc.) into which the user 290 may enter text using a keypad 222 of the keyboard 220. FIG. 2A shows the text area 212 displayed at the same depth as the document 210 in the 3D virtual space 202. The keyboard 220 may include a sensing area 224 that implements one or more of motion sensing, pressure/force sensing, or capacitive (touch) sensing technology located below the keypad 222 to be easily accessible by user 290's thumbs. FIG. 2A shows user 290's left and right thumbs touching at respective contact points 226 in the sensing area 224.

In some embodiments, the GUI of the 3D document editing system may support a gesture to move a text area 212 in a document (e.g., a paragraph, section, column, text field, text box, etc.) forward on the Z axis in 3D virtual space 202 relative to the document 210. FIG. 2B illustrates an example gesture to move a text area 212 forward on the Z axis, according to some embodiments. As shown in FIG. 2B, the user 290 may move or slide both thumbs forward or down (away from the keypad 222, or towards the user) on the sensing area 224 to bring the text area 212 forward so that the text area 212 appears to the user 290 in the 3D virtual space 202 at a depth closer than the depth of the rest of the document 210. This may cause the text area 212 to appear to stand out from the document 210. This gesture may also be used to bring a text area 212 that is at a deeper depth up to the depth of the document 210.

In some embodiments, the GUI of the 3D document editing system may support a gesture to move a text area 212 in a document (e.g., a paragraph, section, column, text field, text box, etc.) backward on the Z axis in 3D virtual space 202 relative to the document 210. FIG. 2C illustrates an example gesture to move a text area 212 backward on the Z axis, according to some embodiments. As shown in FIG. 2C, the user 290 may move or slide both thumbs backward or up (towards the keypad 222, or away from the user) on the sensing area 224 to move the text area 212 backward so that the text area 212 appears to the user 290 in the 3D virtual space 202 at a deeper depth than the depth of the rest of the document 210. This may cause the text area 212 to appear to be inset into the document 210. This gesture may also be used to move a text area 212 that is at closer depth back to the depth of the document 210.

Figure 3A:
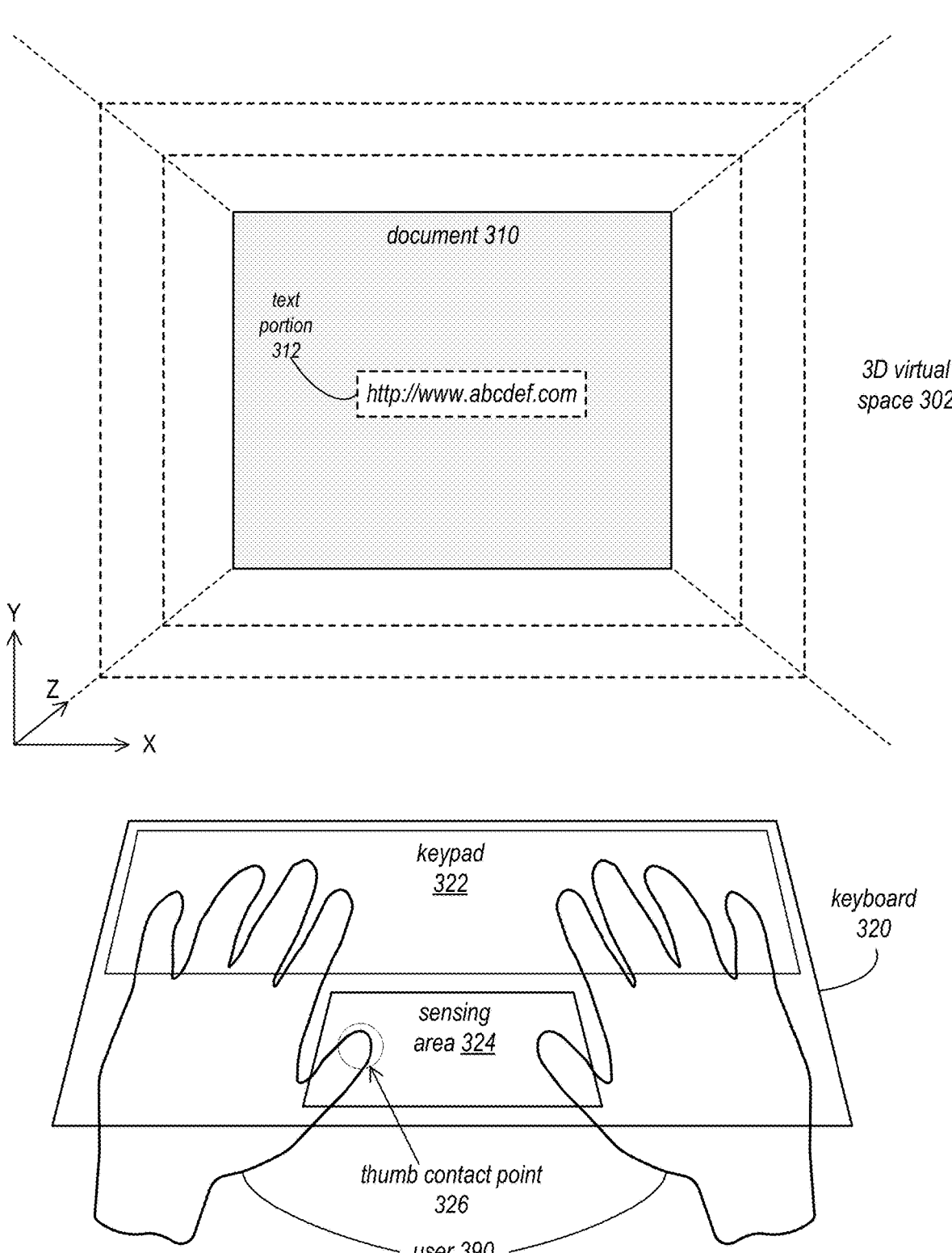
FIGS. 3A through 3C illustrate moving a portion of text forward or backward on a Z axis relative to other content in a document in a 3D virtual space in response to user gestures, according to some embodiments.
Figure 3B:
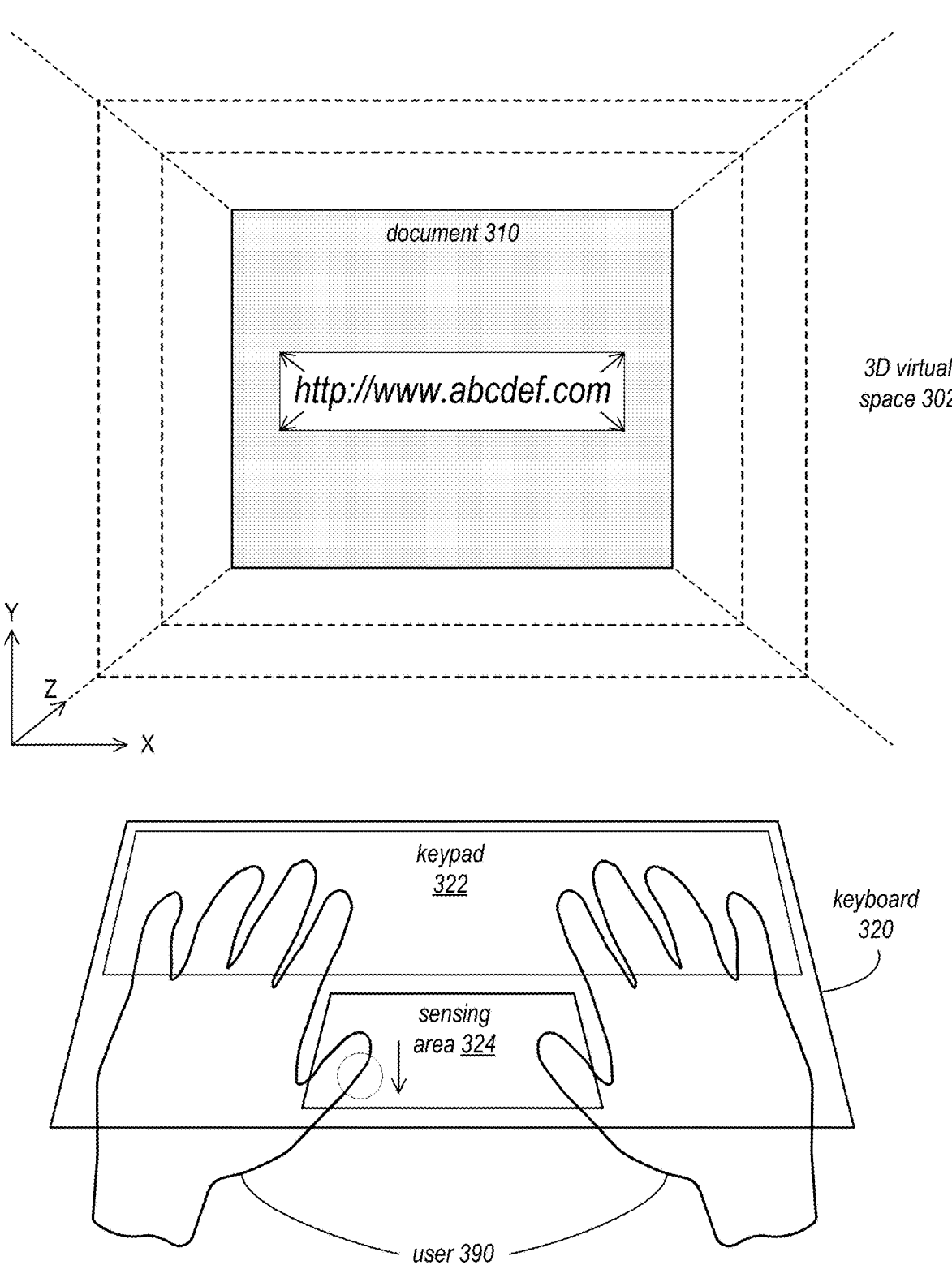
Figure 3C:
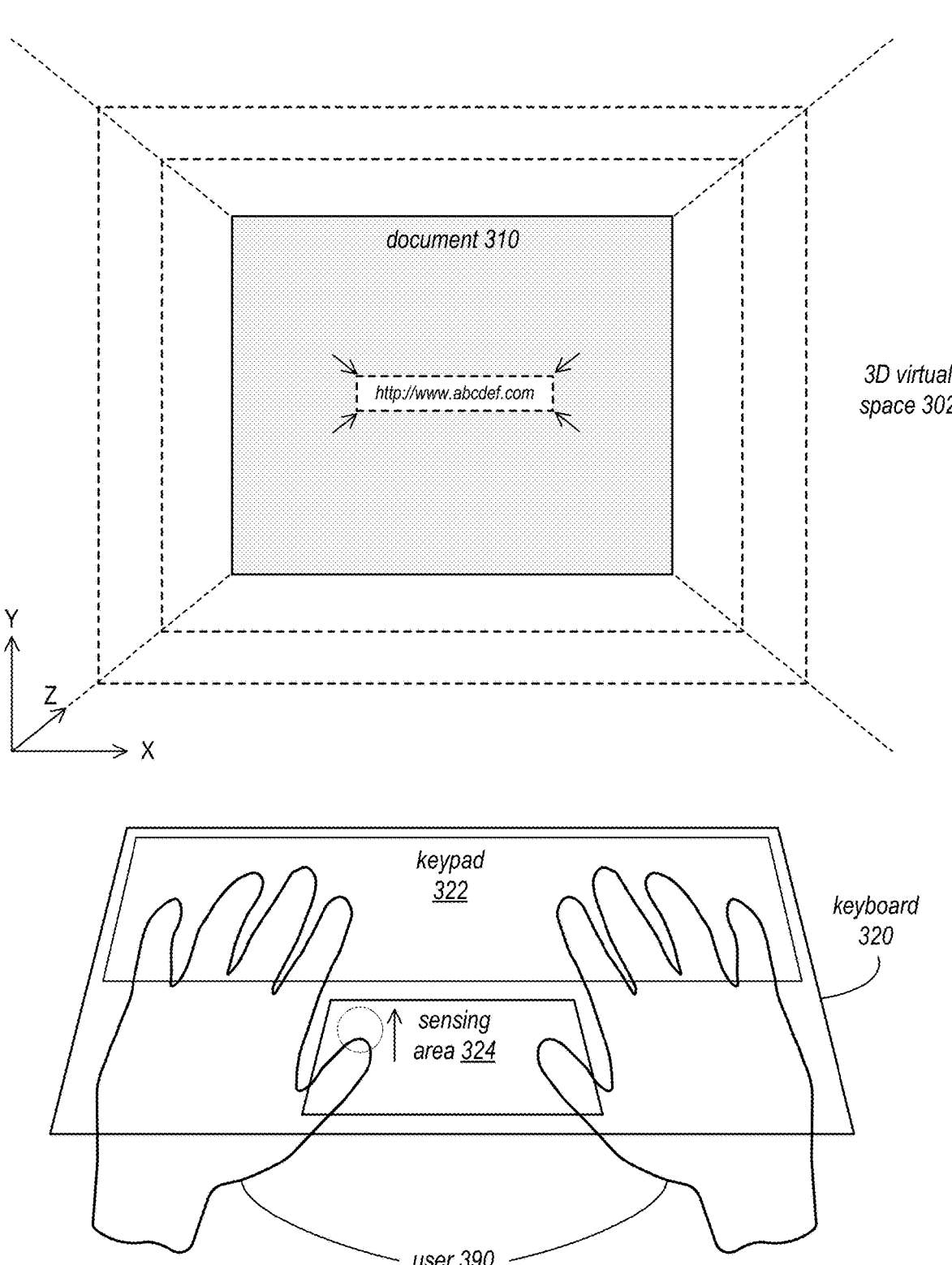
Figure 4A:
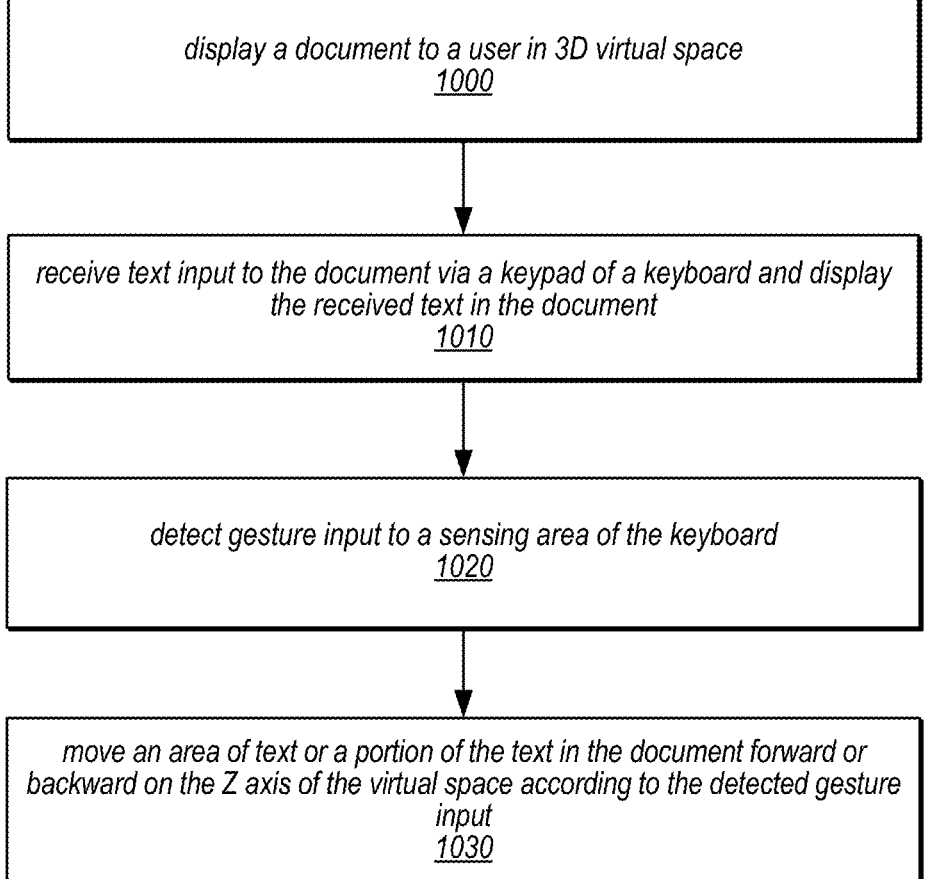
FIGS. 4A and 4B are flowcharts of a method for moving text content forward or backward on Z axis relative to a document in response to user gestures, according to some embodiments.
Figure 4B:
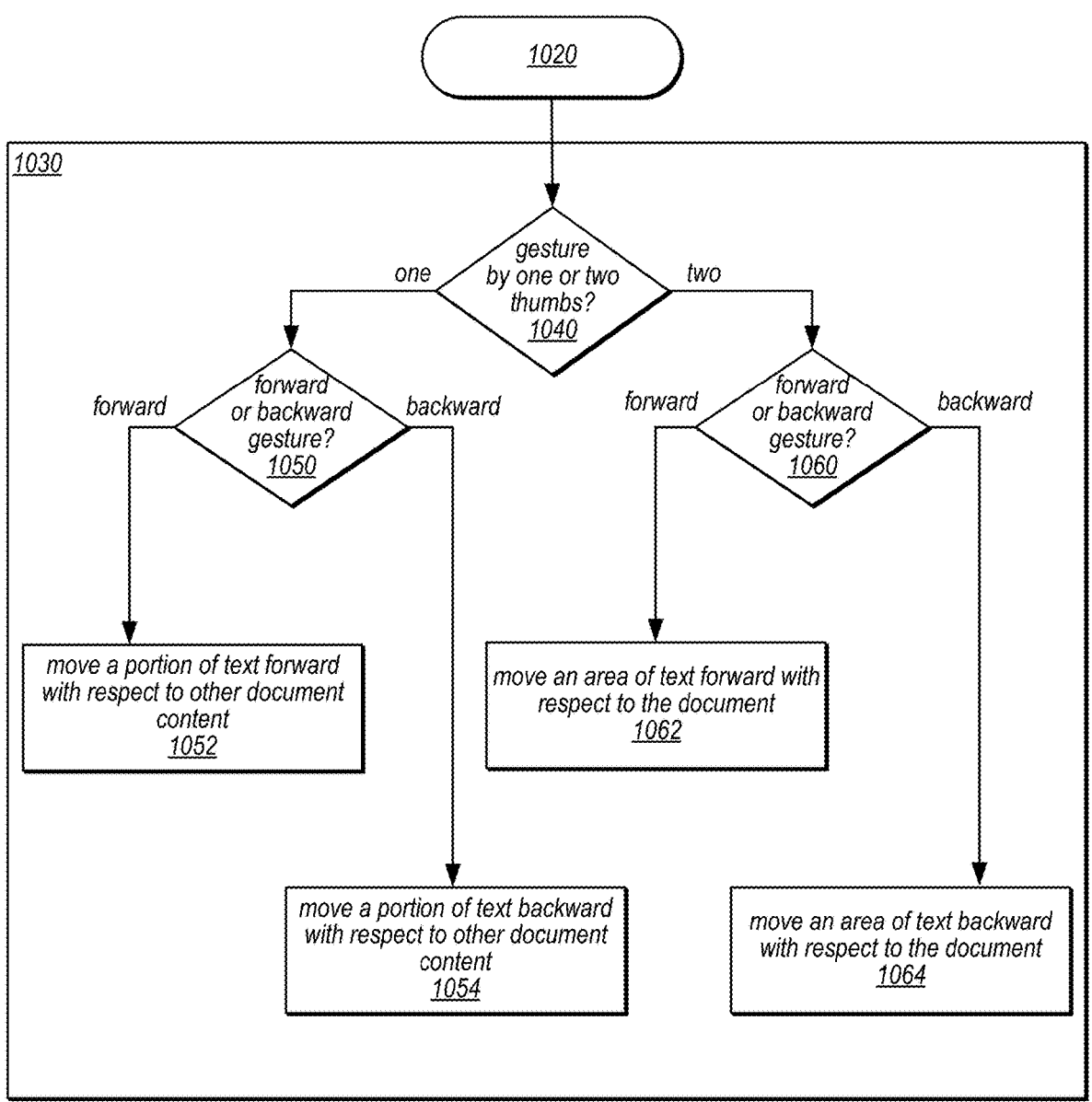

FIGS. 3A through 3C graphically illustrate moving a portion of text forward or backward on a Z axis relative to other content in a document in a 3D virtual space in response to user gestures, according to some embodiments. Moving a portion of text (word, sentence, URL, etc.) forward or backward on the Z axis relative to other content in a document allows the text portions to be displayed at different Z-depths in the 3D virtual space, thus providing a method for emphasizing or highlighting the text portions in the document other than by changing font color, thickness, and/or size as in conventional 2D text generation and editing systems.

As shown in FIG. 3A, a document creator and/or editor (user 390) may use a VR device (not shown) and keyboard 320 of a 3D document editing system to view and edit a document 310 in a 3D virtual space 302 projected by the VR device. The user 390 may enter text to the document 310 using a keypad 322 of the keyboard 320. For example, the user may enter particular portions or units of text (sentences, URLs, or the like). FIG. 3A shows a URL as an example portion or unit of text 312. FIG. 3A shows the text portion 312 displayed at the same depth as the document 310 in the 3D virtual space 302. The keyboard 320 may include a sensing area 324 that implements one or more of motion sensing, pressure/force sensing, or capacitive (touch) sensing technology located below the keypad 322 to be easily accessible by user 390's thumbs. FIG. 3A shows user 390's left thumb touching a contact point 326 in the sensing area 324.

In some embodiments, the GUI of the 3D document editing system may support a gesture to move a text portion 312 in a document (e.g., a URL, sentence, word, title or heading, etc.) forward on the Z axis in 3D virtual space 302 relative to other content (e.g., other portions of text) in the document 310. FIG. 3B illustrates an example gesture to move a text portion 312 forward on the Z axis, according to some embodiments. As shown in FIG. 3B, the user 390 may move or slide one thumb (the left thumb, in this example) forward or down (away from the keypad 322, or towards the user) on the sensing area 324 to bring the text portion 312 forward so that the text portion 312 appears to the user 390 in the 3D virtual space 302 at a depth closer than the depth of other content in the document 310. This may cause the text portion 312 to appear to stand out from the document 310. This gesture may also be used to bring a text portion 312 that is at a deeper depth up to the depth of other content in the document 310.

In some embodiments, the GUI of the 3D document editing system may support a gesture to move a text portion 312 in a document (e.g., a URL, sentence, word, title or heading, etc.) backward on the Z axis in 3D virtual space 302 relative to other content (e.g., other portions of text) in the document 210. FIG. 3C illustrates an example gesture to move a text portion 312 backward on the Z axis, according to some embodiments. As shown in FIG. 3C, the user 390 may move or slide one thumb backward or up (towards the keypad 322, or away from the user) on the sensing area 324 to move the text portion 312 backward so that the text portion 312 appears to the user 390 in the 3D virtual space 302 at a deeper depth than the depth of other content in the document 210. This may cause the text portion 312 to appear to be inset into the document 310. This gesture may also be used to move a text portion 312 that is at closer depth back to the depth of other content in the document 310.

While FIGS. 2A through 2C and 3A through 3C generally describe gestures that are sensed using capacitive or touch sensing technology, other sensing technologies may be used alone or in combination with touch sensing technology to detect gestures. For example, in some embodiments, the pressure or force with which a user presses down on the sensing area of the keyboard with one or both thumbs may be used to indicate particular gestures. As another example, some embodiments may implement motion sensing technology that uses cameras or other sensors to track the user's motions in the sensing area (e.g., motions of one or both thumbs) and that interprets the user's motions (e.g., forward or backward motions with one or both thumbs) to detect particular gestures. Further note that, while embodiments are generally described in which the user uses their thumbs to make the gestures, others of the user's digits, or their entire hands, may also be used to make gestures that may detected and interpreted by the 3D document editing system to add various 3D effects to text in documents.

FIGS. 4A and 4B are flowcharts of a method for moving text content forward or backward on Z axis relative to a document in response to user gestures, according to some embodiments. The method of FIGS. 4A and 4B may, for example, be performed by components of a 3D document editing system as illustrated in FIG. 1A or FIG. 6.

FIG. 4A is a high-level flowchart of a method for moving text content forward or backward on a Z axis relative to a document in response to user gestures, according to some embodiments. As indicated at 1000, a 3D document editing system may display a document to a user in 3D virtual space, for example as illustrated in FIGS. 1A, 2A, and 3A. As indicated at 1010, the 3D document editing system may receive text input to the document via a keypad (e.g., a QWERTY keypad) of a keyboard and display the text in the document, for example as illustrated in FIGS. 1A, 2A, and 3A. As indicated at 1020, the 3D document editing system may detect gesture input to a sensing area of the keyboard, for example as illustrated in FIGS. 2B, 2C, 3B, and 3C. As indicated at 1030, the 3D document editing system may move an area of text or a portion of the text in the document forward or backward on the Z axis of the virtual space according to the detected gesture input, for example as illustrated in FIGS. 2B, 2C, 3B, and 3C.

FIG. 4B is a more detailed flowchart of a method for processing a user's gestures for moving text content forward or backward on a Z axis relative to a document, according to some embodiments. The method of FIG. 4B may, for example, be performed at element 1030 of FIG. At 1040, upon detecting a gesture by the user using the sensing technology of the 3D document editing system, the 3D document editing system may determine whether the gesture was made with one or two thumbs. If the gesture was made using one thumb, then the method goes to element 1050. If the gesture was made using two thumbs, then the method goes to element 1060.

At 1050, the 3D document editing system may determine if the user made a forward (away from the keypad, or towards the user) or backward (towards the keypad, or away from the user) gesture with the one thumb. If the gesture is a forward gesture, then the method goes to element 1052, and a portion of text (e.g., a word, sentence, URL, etc.) is moved forward relative to other document content as illustrated in FIG. 3B. If the gesture is a backward gesture, then the method goes to element 1054, and a portion of text is moved backward relative to other document content as illustrated in FIG. 3C.

At 1060, the 3D document editing system may determine if the user made a forward (away from the keypad, or towards the user) or backward (towards the keypad, or away from the user) gesture with the two thumbs. If the gesture is a forward gesture, then the method goes to element 1062, and a text area (e.g., paragraph, section, column, text box, etc.) is moved forward relative to the document as illustrated in FIG. 2B. If the gesture is a backward gesture, then the method goes to element 1064, and a text area is moved backward relative to the document as illustrated in FIG. 2C.

FIG. 5 is a high-level flowchart of an example method for automatically moving text content forward or backward on Z axis relative to a document in response to user text input, according to some embodiments. As indicated at 1100, a 3D document editing system may display a document to a user in 3D virtual space, for example as illustrated in FIGS. 1A, 2A, and 3A. As indicated at 1110, the 3D document editing system may receive input to the document via a keypad of a keyboard, for example as illustrated in FIGS. 1A, 2A, and 3A. As indicated at 1120, the 3D document editing system may monitor the input to the document via the keypad, and may apply rules to keypad entries (e.g., strings of alphanumeric, punctuation, and/or symbolic characters) to detect particular types of text items, strings, or other keypad entries (e.g., URLs, particular strings, sentences, or phrases, keywords, titles or headings, key combinations, special characters, etc.) as defined by the rules. For example, one rule may apply to the string "http://" (and/or to other protocol identifiers such as "https://") to identify the string as a protocol identifier and thus to recognize the text input as a URL. For instance, an example format for a rule may be:

(<rule string>, <direction>)

where <rule string> defines a string corresponding to a keypad entry to be detected (e.g., "http://"), and <direction> specifies a direction (e.g., forward or backward) on the Z axis to move the keypad entry. Example pseudocode for applying the rule may be:

if (<string> contains <rule string>), move_string(<start>, <length>, <direction>) where mov_estring( ) is a function that moves a string of text identified by the start and length parameters in the specified direction on the Z axis relative to other text in the document or in a text area of the document.

As indicated at 1130, the 3D document editing system may detect keypad input indicating a particular type of keypad entry (e.g., a URL) as defined by the rules. As indicated at 1140, the 3D document editing system may move a portion or area of the text in the document including the identified keypad entry (e.g., a URL) forward or backward on the Z axis of the virtual space relative to the document in response to detecting the special type of keypad entry.

FIG. 6 is a block diagram illustrating components of a 3D document editing system, according to some embodiments. In some embodiments, a 3D document editing system 1900 may include a virtual reality (VR) device 2000 such as a VR headset, helmet, goggles, or glasses, and a keyboard 2050. The VR device 2000 and keyboard 2050 may be coupled via a wired or wireless (e.g., Bluetooth) connection.

VR device 2000 may implement any of various types of VR projector systems. For example, the VR device 2000 may include a near-eye VR projector that projects frames including left and right images on screens that are viewed by a subject, such as DLP (digital light processing), LCD (liquid crystal display) and LCoS (liquid crystal on silicon) technology VR projectors. As another example, the VR device 2000 may include a direct retinal VR projector that scans frames including left and right images, pixel by pixel, directly to the subject's eyes. To create a three-dimensional (3D) effect in a VR projector system, objects at different depths or distances in the two images are shifted left or right as a function of the triangulation of distance, with nearer objects shifted more than more distant objects.

VR device 2000 may include a 3D projector 2020 that implements the VR projection technology that generates the 3D virtual space 2002 viewed by the user, for example near-eye VR projection technology or direct retinal projection technology. VR device 2000 may also include a controller 2030 configured to implement functionality of a VR system and of the 3D document editing system as described herein and to generate the frames (each frame including a left and right image) that are projected or scanned by the 3D projector 2020 into the 3D virtual space 2002. VR device 2000 may also include a memory 2032 configured to store software (code 2034) of the VR system and of the 3D document editing system that is executable by the controller 2030, as well as data 2038 that may be used by the VR system and/or the 3D document editing system when executing on the controller 2030. In some embodiments, memory 2032 may store rules 2036 that may be applied to keypad 2060 entries by the 3D document editing system to detect particular types of text items, strings, or other entries as described in reference to FIG. 5. VR device 2000 may also include one or more interfaces 2040 (e.g., a Bluetooth technology interface) configured to receive user input from keyboard 2050 via a wired or wireless connection and provide the received input to the controller 2030.

In various embodiments, controller 2030 may be a uniprocessor system including one processor, or a multiprocessor system including several processors (e.g., two, four, eight, or another suitable number). Controller 2030 may include central processing units (CPUs) configured to implement any suitable instruction set architecture, and may be configured to execute instructions defined in that instruction set architecture. For example, in various embodiments controller 2030 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 2030 may employ any microarchitecture, including scalar, superscalar, pipelined, superpipelined, out of order, in order, speculative, non-speculative, etc., or combinations thereof. Controller 2030 may include circuitry to implement microcoding techniques. Controller 2030 may include one or more processing cores each configured to execute instructions. Controller 2030 may include one or more levels of caches, which may employ any size and any configuration (set associative, direct mapped, etc.). In some embodiments, controller 2030 may include a graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations.

Memory 2032 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

Keyboard 2050 may, for example, be a physical keyboard device that includes a keypad 2060, for example a QWERTY keypad, for entering alphanumeric text, punctuation marks, symbols, etc. The keyboard 2050 may also include a gesture sensing component 2070 that implements sensing technology, for example at an area of the keyboard 2050 just below the keypad 2070, to sense gestures made by a user, for example motions made with the user's thumbs. The gesture sensing component 2070 may, for example, implement one or more of motion sensing, pressure/force sensing, or capacitive (touch) sensing technology. In some embodiments, keyboard 2050 may instead be implemented as a digital keyboard, for example displayed on a touch-enabled screen of a device such as a pad or tablet. In some embodiments, keyboard 2050 may instead be implemented as a virtual keyboard displayed in 3D virtual space 2002 by the 3D document editing system 1900 via the VR device 2000.

The VR device 2000 may be configured to display a virtual document 2010 in a 3D virtual space 2002 according to a 3D text generation and editing GUI provided by the 3D text generation and editing system 1900 via the VR device 2000 that allows a user to enter or edit text in the document 2010 via a keypad 2060 (e.g., a standard QWERTY keypad) of the keyboard 2050. Unlike conventional 2D graphical user interfaces, using embodiments of the 3D document editing system 1900, areas or portions 2012 of text (e.g., text areas, text fields, text boxes, paragraphs, sections, columns, sentences, words, URLs, etc.) in a document 2010 can be placed at or moved to various Z-depths in the 3D virtual space 2002. The gesture sensing component 2070 of the keyboard 2050 may detect gestures, for example motions of the user thumbs when on or near the gesture sensing component 2070. The VR device 2000 may receive user input indicating gestures made by the user via the gesture sensing component 2070, and in response may move selected content 2012 in document 2010 (e.g., paragraphs, sections, columns, sentences, text boxes, URLs, etc.) forward or backward on a Z axis in the 3D virtual space 2002 relative to the rest of the document 2010 according to the detected gestures. The gesture sensing component 2070 of the keyboard 2050 may be configured to allow the user to make the gestures while entering text via the keypad 2060, thus allowing the user to provide 3D effects to areas or portions of text in the document 2010 while typing.

In some embodiments, the VR device 2000 may instead or also monitor text entry made using the keypad 2070 of the keyboard 2050, apply rules to the entered text to determine particular kinds of text items such as URLs, and automatically shift the particular kinds of text items (e.g., URLs) forward or backward on the Z axis relative to the rest of the content in the document 2010. FIG. 5 describes an example method for processing text entry to add 3D effects to a document 2010 that may be used in a 3D document editing system 1900 as illustrated in FIG. 6, according to some embodiments.

While not shown in FIG. 6, in some embodiments the 3D document editing system 1900 may include one or more other components. For example, the system 1900 may include a cursor control device (e.g., mouse) for moving a virtual cursor in the 3D virtual space 2002, selecting portions or areas of text or other content in a displayed document 2010, and so on. As another example, in some embodiments, the 3D document editing system 1900 may include a computing device coupled to the VR device 2000 and keyboard 2050 via wired or wireless (e.g., Bluetooth) connections that implements at least some of the functionality of the 3D document editing system 1900, for example processing user inputs to the keyboard 120 and generating images and image content to be displayed in the 3D virtual space 2002 by the VR device 2000.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
an electronic device configured to:
    display a document including text in a 3D virtual space for viewing by a user;
    monitor text input for a string of characters from an input device configured to receive the text input for the string from a user, wherein said monitor applies a rule, of one or more rules, to recognize, based on identification of the string as containing a rule string, the string as a particular type of text input, and wherein the rule specifies two or more selected from:
        a start for movement of the string of the particular type from the input device,
        a length of movement to move the string of the particular type, and a direction of movement to move the string of the particular type;
    detect, based on said monitor, that the text input comprises the particular type of text input specified by the rule; and
    move, based upon said detect that the text input from the input device comprises the particular type of text input specified by the rule, at least a portion of the document that includes the text input in accordance with the two or more selected from the start for movement, the length of movement, and the direction of movement specified by the rule.

2. The system of claim 1, wherein to move at least the portion of the document, the electronic device is further configured to:

add 3D effects to at least the portion of the document based at least in part on the one or more rules.

3. The system of claim 1, wherein the electronic device is further configured to:

determine whether to move a text area or a text portion of the document that includes the text input based on the one or more rules.

4. The system of claim 3, wherein the text area is one of a paragraph, a column, a section, a text field, or a text box.

5. The system of claim 3, wherein the text portion is one of a word, a sentence, a title, a heading, or a uniform resource locator (URL).

6. The system of claim 1, further comprising the input device, wherein the input device comprises a keyboard or a keypad, and wherein the electronic device comprises an augmented reality device, a virtual reality device, or a mixed reality device.

7. A device, comprising:

a controller; and a projector configured to display a document including text in a 3D virtual space for viewing by a user under control of the controller, wherein the controller is configured to:

monitor text input for a string of characters from an input device, wherein said monitor applies a rule, of one or more rules, to recognize, based on identification of the string as containing a rule string, the string as a particular type of text input, and wherein the rule of the one or more rules specifies two or more selected from:

a start for movement of the string of the particular type from the input device, a length of movement to move the string of the particular type, and a direction of movement to move the string of the particular type;

detect, based on said monitor, that the text input comprises the particular type of text input specified by the rule; and move, based upon said detect that the text input comprises the particular type of text input specified by the rule, at least a portion of the document that includes the text input in accordance with the two or more selected from the start for movement, the length of movement, and the direction of movement specified by the rule.

8. The device of claim 7, wherein to move at least the portion of the document, the controller is further configured to:

add 3D effects to at least the portion of the document based at least in part on the one or more rules.

9. The device of claim 7, wherein the controller is further configured to:

determine whether to move a text area or a text portion of the document that includes the text input based on the one or more rules.

10. The device of claim 9, wherein the text area is one of a paragraph, a column, a section, a text field, or a text box.

11. The device of claim 9, wherein the text portion is one of a word, a sentence, a title, a heading, or a uniform resource locator (URL).

12. The device of claim 7, further comprising the input device, wherein the input device comprises a keyboard or a keypad.

13. A method, comprising:

performing, by an electronic device:

displaying a document including text in a 3D virtual space for viewing by a user;

monitoring received text input for a string of characters via an input device, wherein said monitor applies a rule one or more rules to recognize, based on identification of the string as containing a rule string, the string as a particular type of text input, and wherein the rule specifies two or more selected from:

a start for movement of the string of the particular type from the input device, a length of movement to move the string of the particular type, and a direction of movement to move the string of the particular type;

detecting, based on said monitoring, that the text input comprises the particular type of text input specified by the rule; and moving, based upon said detecting that the text input from the user comprises the particular type of text input specified by the rule, at least a portion of the document that includes the text input in accordance with the two or more selected from the start for movement, the length of movement, and the direction of movement specified by the rule.

14. The method of claim 13, further comprising:

adding 3D effects to at least the portion of the document based at least in part on the one or more rules.

15. The method of claim 13, further comprising:

determining whether to move a text area or a text portion of the document that includes the text input based on the one or more rules.

16. The method of claim 15, wherein the text area is one of a paragraph, a column, a section, a text field, or a text box.

17. The method of claim 15, wherein the text portion is one of a word, a sentence, a title, a heading, or a uniform resource locator (URL).

* * * * *